United States Patent [19]

Betulius

[11] 4,129,082

[45] Dec. 12, 1978

[54] EARTH WORKING AND FLUID DISTRIBUTION APPARATUS

[75] Inventor: Gilbert E. Betulius, Evansville, Ind.

[73] Assignee: Chem-Farm Inc., Evansville, Ind.

[21] Appl. No.: 758,588

[22] Filed: Jan. 12, 1977

[51] Int. Cl.² .................................................. A01C 23/02
[52] U.S. Cl. ......................................... 111/7; 111/86; 172/724
[58] Field of Search .............. 111/7, 6, 9, 57, 73, 111/80, 85, 86; 172/193, 194, 730, 731, 732, 700, 699

[56] References Cited

U.S. PATENT DOCUMENTS

| | | | |
|---|---|---|---|
| 945,020 | 1/1910 | Crenshaw | 172/194 |
| 1,908,903 | 5/1933 | Kovar | 172/724 |
| 2,768,591 | 10/1956 | James | 111/7 |
| 2,781,733 | 2/1957 | Graham | 111/7 |
| 2,842,077 | 7/1958 | Morrison | 111/85 |
| 2,849,969 | 9/1958 | Taylor | 111/7 |
| 2,988,026 | 6/1961 | Hechathorn | 111/7 |
| 3,605,657 | 9/1971 | Brannan | 111/85 |
| 3,946,681 | 3/1976 | Sylvester | 111/7 |
| 3,956,999 | 5/1976 | English | 111/7 |

*Primary Examiner*—Edgar S. Burr
*Assistant Examiner*—James R. Feyrer
*Attorney, Agent, or Firm*—Olson, Trexler, Wolters, Bushnell & Fosse, Ltd.

[57] ABSTRACT

An earth-working and fluid distribution apparatus is disclosed including a plow having a frame and a shank connected thereto. The apparatus further includes a, shovel for breaking the earth and creating a furrow connectable to the shank, a fluid supply source attachable to the plow frame, fluid distribution means connectable to the plow shank and having connecting means to the fluid supply means, means for suppressing the soil connectable to the plow shank to seal the fluid into the soil following the distribution of the fluid, and means connectable to the plow shank for removing weeds during the plowing operation.

4 Claims, 5 Drawing Figures

U.S. Patent  Dec. 12, 1978  Sheet 1 of 2  4,129,082
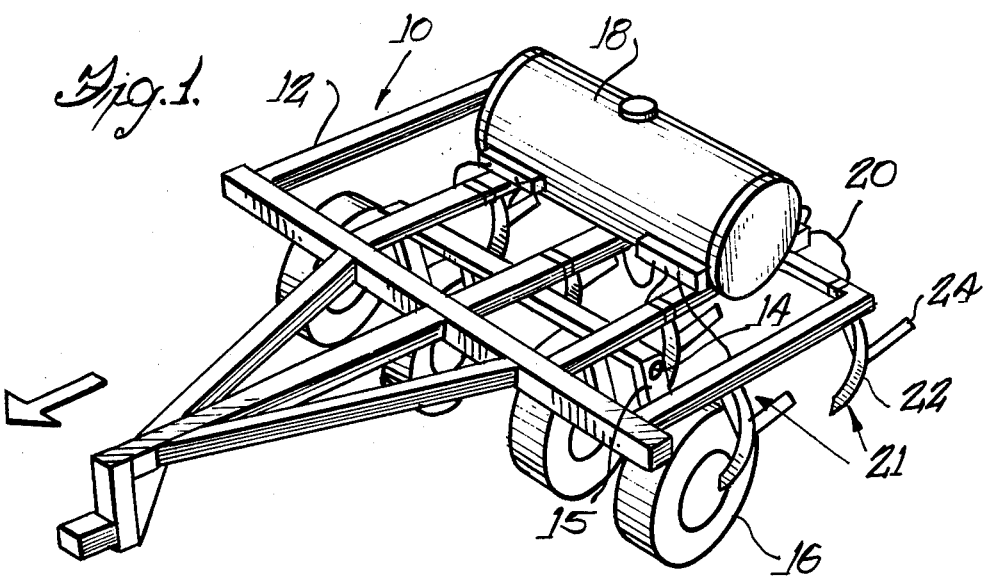
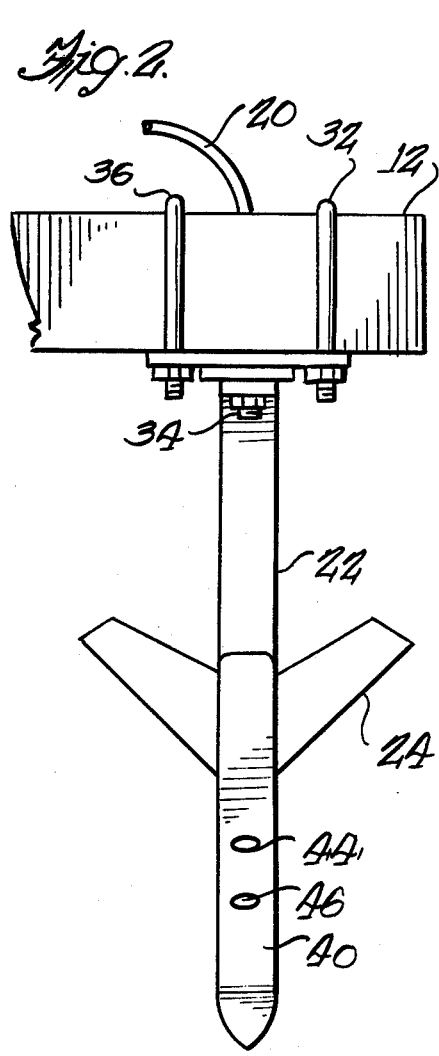
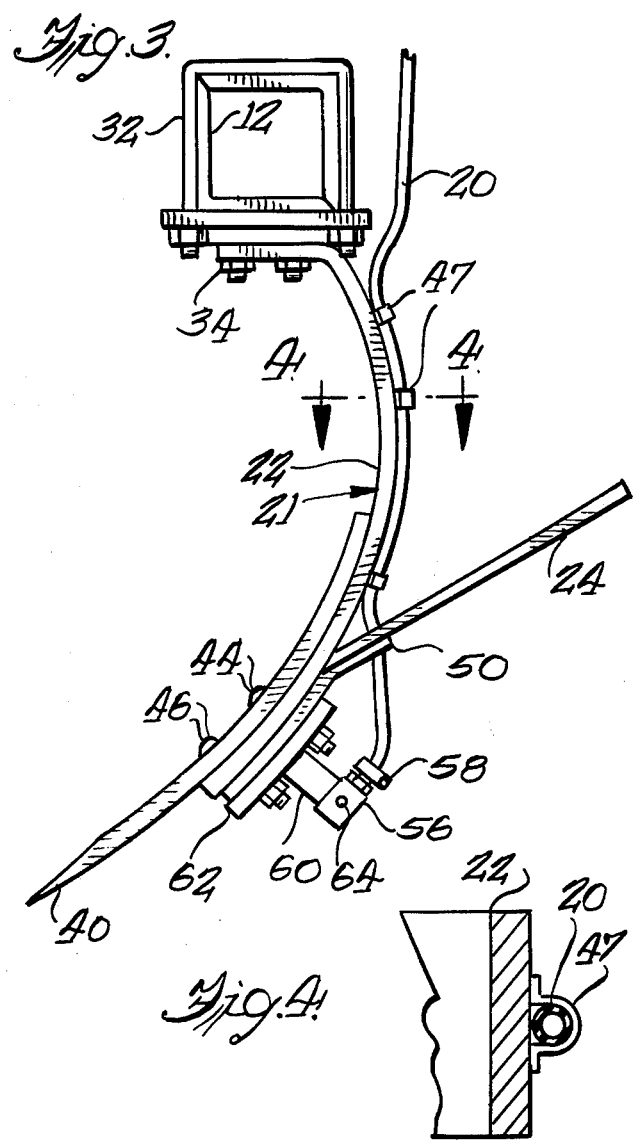

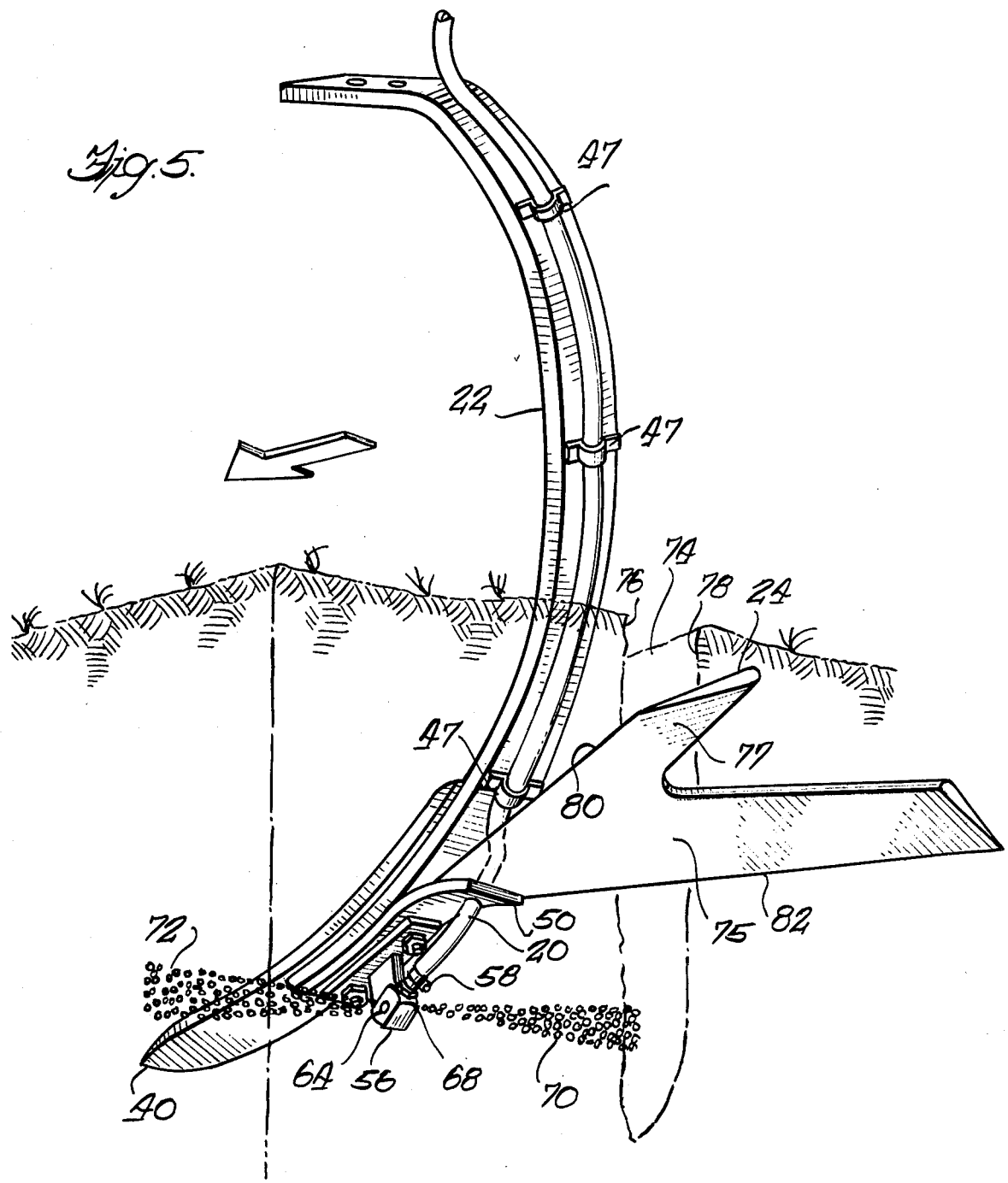

EARTH WORKING AND FLUID DISTRIBUTION APPARATUS

BACKGROUND OF THE INVENTION

The present invention relates generally to an earth-working and fluid distribution apparatus, and more particularly to an earth-working and fluid distribution apparatus for use in conjunction with a plow apparatus such as a chisel plow.

A basic and well-known farming technique includes, among other things, preparation of a field for the planting of crops. This preparation is often accomplished by driving a tractor or other suitable vehicle over the area to be prepared, pulling a plowing device, such as a chisel plow, to break and furrow the soil. It is also desirable, preparatory to planting or in cultivation, to employ some means for removing weeds from the field, and to distribute fertilizer. Heretofore, it has been a common practice to use several pieces of equipment drawn separately over the ground to perform each of the aforesaid functions. Thus, first a plowing device is employed to break the soil in the desired manner, then a second apparatus is used to remove weeds, and yet a third apparatus to apply fertilizer. This technique of using separate implements to perform each function is time consuming, as it requires making a number of trips over the same ground, in order to perform each function.

Fluid fertilizers such as anhydrous ammonia, are often in a highly volatile liquid or a gaseous state at the point of application. In such a state there is frequently a tendency for a significant portion of the fertilizer to escape into the atmosphere. This, of course results in undesirable waste and expense.

OBJECTS AND SUMMARY OF THE INVENTION

It is an object of the present invention to provide novel and improved means for applying a fluid material such as a fertilizer to plowed soil.

A more specific object of the present invention is to provide novel and improved means for applying a fluid fertilizer in conjunction with plowing, so as to form a single operation.

A further object of the present invention is to provide fluid distribution means including means for holding a relatively volatile fluid or a gas in the soil, once applied, so as to minimize waste.

A further object of the present invention is to provide a novel apparatus which includes means for plowing, fluid distribution, and weed control, so that all three functions may be efficiently performed in a single operation.

In accordance with the present invention, there is provided an earth-working and fluid distribution apparatus comprising plow means for grooving and fracturing the soil including a rigid frame, shank means attached to said frame, and soil fracturing means attached to said shank, fluid supply means mounted on the frame, fluid flow means connected to said fluid supply means, fluid distribution means connected to said shank means and to said fluid flow means for distributing fluid into said fracture created by said grooving and fracturing means, means for sealing said fluid into the soil following said distribution of said fluid, and means for cutting weeds below the surface of the soil as said apparatus moves through the earth to be worked.

Other objects, features and advantages of the present invention may be more readily understood by reference to the following detailed description when taken in connection with the accompanying drawings wherein:

FIG. 1 is a perspective view of a plowing structure in conjunction with the apparatus according to the present invention;

FIG. 2 is a more detailed view of a portion of FIG. 1 incorporating features of the present invention;

FIG. 3 is a side elevational view of FIG. 2 illustrating a number of features of the present invention in greater detail;

FIG. 4 is an enlarged sectional view taken along line 4—4 of FIG. 3; and

FIG. 5 is a perspective view of an embodiment of an apparatus according to the present invention in conjunction with a portion of ground being worked.

DETAILED DESCRIPTION OF THE ILLUSTRATED EMBODIMENT

Referring now to FIG. 1, and earth-working and fluid distribution apparatus 10 incorporating features of the present invention is illustrated. The apparatus 10 includes a frame 12 with a fluid source 18 mounted thereon, and a rock shaft 14 transversely journaled upon the frame 12. The rock shaft is affixed to a plurality of wheels 16 by support struts 15 attached to wheels 16 positioned for angular movement with the rock shaft 14 relative to the frame 12 from a transport position to a work position. Also included is a plurality of plowing tools 21 each comprising shank means 22 connected to the frame 12.

Referring now to FIGS. 2, 3 and 4, a plowing tool 21 of FIG. 1 along with associated elements according to the present invention, are shown in greater detail. Each tool shank 22 has a substantial transverse width defined by longitudinal edges of the tool so as to insure breaking and furrowing of the ground. The shank means may be provided with an integral tip, but preferably shovel means 40 is attached to the shank 22 by bolts 44 and 46 or other suitable means.

In order to cultivate weeds or the like, a sweep member 24 is attached to shank 22 by the connecting means 44 and 46 and a plate 50, in a position to pass through the soil below the surface thereof. Connecting means 32, 34 and 36 connect the shank 22, together with sweep 24 and shovel 40 attached thereto, to the frame 12.

In accordance with a feature of the present invention the apparatus is constructed for dispensing fluid fertilizer directly into the plowed ground. The structure is particularly suitable for applying fertilizer such as anhydrous ammonia which is delivered to the ground in a gaseous state. More specifically the tank 18 mounted on the plow frame is adapted to contain a supply of anhydrous ammonia or other fluid. Distribution means including conduits or tubes 20 extend from the tank to each of the plowing tools 21.

Referring to FIG. 3, a tube or conduit 20 is shown running behind a shank 22 and connected thereto by suitable connecting fastener means 47. The tube 20 extends to a position beneath the sweep blade 24 and is connected to fluid distribution or discharge nozzle means 56, by connecting means 58. The discharge nozzle 56 is connected to shank means 22 by connecting member 60 secured to plate 62, and the bolts 44 and 46. The discharge nozzle preferably includes oppositely facing discharge ports 64 and 68 disposed for directing the anhydrous ammonia or other fluid laterally outwardly from behind opposite sides of the plowing tool.

Referring now to FIG. 5, the manner in which the apparatus according to the present invention functions in a field being plowed is shown. The shovel means 40 attached to the shank 22 breaks the soil with its leading edge, creating a furrow 74 as the apparatus is propelled through the field. A suitable valve, not show, is connected in the fluid system for permitting flow from the tank 18 to the conduit 20. When this valve is opened during a plowing and fertilizing operation, the fluid distribution means 56, attached immediately behind the shovel 40 as described above directs the fluid through the fluid ports 64 and 68 located at either side thereof, in the form of two columns of spray 70 and 72.

It is to be noted that the jets or sprays 70 and 72 are located toward the lower end of the plowing tool so that the anhydrous ammonia is directed against opposite walls of the furrow 74 at a location adjacent the bottom of the furrow. Furthermore the nozzle 56 is located beneath a forward or leading narrow end of the sweep 24, which sweep has rearwardly diverging blade portions 75 and 77 which pass through the ground above and behind the sprays 70 and 72. The leading narrow portion of the sweep adjacent the shank does not extend beyond the longitudinal edges of the tool, thus to prevent positive sweep disturbance of the furrow wall in this area. The construction is such that the sweep 24 functions to cut substantially horizontally across the furrow 74 created by shovel means 40 below the surface of the ground to pull soil beneath the sweep 24 from sides, 76 and 78 of the furrow 74 and compact or displace the soil downwardly to trap the fluid from sprays 70 and 72 so as to minimize leakage thereof into the atmosphere. The sweep means 24 is also provided with sharp edges 80 and 82, to aid in cultivation by cutting off weeds at a point below the surface of the soil.

While a preferred embodiment of the invention has been shown and described, it is obvious that many details may be changed without departing from the spirit and scope of the appended claims.

The invention is claimed as follows:

1. An earth working and fluid distribution apparatus comprising a mobile plow including a rigid frame, soil grooving and fracturing means including shank means attached to said frame and a tool having a leading edge attached to said shank means with a transverse width defined by the horizontal distance between the vertical edges thereof for creating a furrow in communication with the soil as said mobile plow travels thereacross, fluid supply means attached to said frame, fluid distribution means connected to said fluid supply means, said fluid distribution means terminating in fluid discharge means connected to said shank means above and behind the leading edge of said tool, said fluid discharge means having opposed nozzle means for discharging fluid substantially laterally against opposed sidewalls of said furrow created by said soil grooving and fracturing means, rearwardly diverging sweep means connected to said shank means and having a leading portion having a transverse width no greater than said transverse width of said tool disposed substantially directly above the fluid discharge means to prevent positive disturbance of the tool created furrow side walls until after said nozzle means has passed thus facilitating fluid issuing from the nozzle means reaching the tool created furrow side walls, said sweep means diverging to a width greater than the transverse width of said tool behind and only behind said nozzle means and extending above and behind said nozzle means for contacting the sidewalls of said furrow only after said nozzle means has passed and displacing soil from the sidewalls of the furrow downwardly to effect sealing of said fluid in the soil following said discharge of said fluid.

2. The apparatus of claim 1 wherein said sweep means comprises a sweep member having rearwardly diverging blade portions for piercing the sides of said furrow and moving soil below said blade portions from the sides of said furrow to cover said fluid with soil following the distribution of said fluid.

3. The apparatus of claim 1, with said sweep member further including sharpened outer edge portions on said blade portions to cut off weeds at a point below the surface of the soil.

4. An apparatus as defined in claim 1, wherein each sweep means includes cutting edges for severing weeds and the like below the surface of the soil.

* * * * *

UNITED STATES PATENT AND TRADEMARK OFFICE
CERTIFICATE OF CORRECTION

PATENT NO. : 4,129,082
DATED : December 12, 1978
INVENTOR(S) : GILBERT E. BETULIUS It is certified that error appears in the above-identified patent and that said Letters Patent are hereby corrected as shown below:

Col. 4, lines 5 & 6, cancel "communication with";

Col. 4, line 9, after "in" insert --communication with--;

Col. 4, line 37, change "claim 1" to --claim 2--.

Signed and Sealed this

Fifth Day of June 1979

[SEAL]

Attest:

RUTH C. MASON
Attesting Officer

DONALD W. BANNER
Commissioner of Patents and Trademarks